(12) United States Patent
Junkers

(10) Patent No.: US 6,810,571 B1
(45) Date of Patent: Nov. 2, 2004

(54) METHOD OF TIGHTENING AND LOOSENING AN OBJECT

(76) Inventor: John K. Junkers, 8 Stonewall Rd., Saddle River, NJ (US) 07458

(*) Notice: Subject to any disclaimer, the term of this patent is extended or adjusted under 35 U.S.C. 154(b) by 0 days.

(21) Appl. No.: 10/625,575

(22) Filed: Jul. 23, 2003

(51) Int. Cl.⁷ .................................................. B23P 19/00
(52) U.S. Cl. ....................... 29/452; 29/446; 29/525.02; 29/525.11; 411/223; 411/433; 81/57.36; 81/57.38
(58) Field of Search ...................... 29/446, 452, 525.01, 29/525.02, 525.11; 81/57.16, 57.36, 57.38; 411/223, 432, 433; 173/36, 37, 164

(56) References Cited

U.S. PATENT DOCUMENTS

| | | | | |
|---|---|---|---|---|
| 2,760,393 A | * | 8/1956 | Stough | 81/57.38 |
| 3,633,446 A | * | 1/1972 | Tadahira et al. | 81/57.46 |
| 5,123,308 A | * | 6/1992 | Shaffer | 81/57.31 |
| 5,137,408 A | * | 8/1992 | Junkers | 411/432 |
| 5,253,967 A | * | 10/1993 | Orban et al. | 411/432 |
| 5,318,397 A | * | 6/1994 | Junkers | 411/432 |
| 5,499,558 A | * | 3/1996 | Junkers | 81/57.39 |
| 5,946,789 A | * | 9/1999 | Junkers | 29/446 |
| 6,125,243 A | * | 9/2000 | Shoji et al. | 399/29 |
| 6,253,642 B1 | * | 7/2001 | Junkers | 81/55 |
| 6,254,323 B1 | * | 7/2001 | Junkers | 411/14.5 |
| 6,490,952 B2 | * | 12/2002 | Junkers | 81/57.39 |

FOREIGN PATENT DOCUMENTS

| | | |
|---|---|---|
| DE | 1 902 413 | 10/1969 |
| EP | 0 593 742 B1 | 9/1998 |

* cited by examiner

Primary Examiner—Eric Compton
(74) Attorney, Agent, or Firm—Michael J. Striker

(57) ABSTRACT

A method of tightening and loosening an object to a rotary base torsion-free includes providing a single power tool having a tool housing portion and a driving portion which are coaxial with one another and provide equal but opposite forces, connecting a bolt with the rotary base, connecting a first part which includes a sleeve/washer assembly to one of the portions to be turned by the one portion, which sleeve/washer assembly includes a sleeve with a thread cooperating with a thread of the bolt and a washer abutting against the object, connecting a second part to the other of the portions to be turned by the other portion, which second part includes a nut having a thread cooperating with another thread of the first part, turning the first part by the one portion so that the first part, the bolt and the rotary base turn together while the second part remains free of rotation to urge the bolt to move in a desired axial direction to tighten or loosen the object to the rotary base, and turning the second part by the other portion so that the rotary base, the bolt and the first part remain free of rotation to urge the bolt in the desired axial direction to tighten or loosen the object to the rotary base.

3 Claims, 1 Drawing Sheet

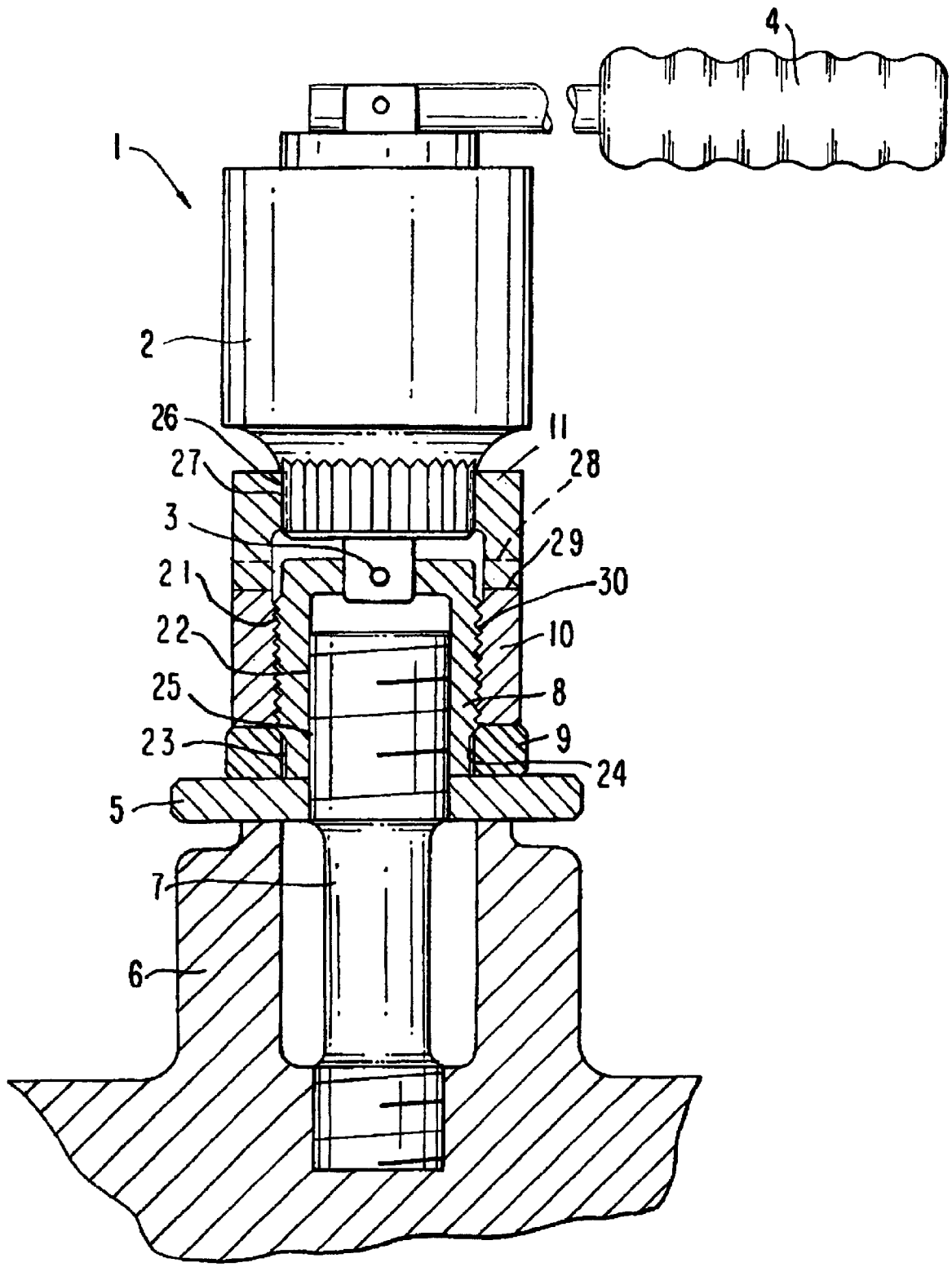

METHOD OF TIGHTENING AND LOOSENING AN OBJECT

BACKGROUND OF THE INVENTION

The present invention relates to methods of tightening and loosening of objects.

More particularly it relates to methods of tightening and loosening objects on rotary bases.

There are a variety of different bolting applications in the industry. While the majority consists of flanges and casings or a static base, there are also applications on rotors and the like with rotary bases. In applying torque to a nut connected with a bolt, which is to connect two parts with one another, it often occurs that on static applications the bolt turns along with the nut and on the rotary applications the base turns along with the nut. One usually applies a backup wrench to stop the bottom nut from turning, or in case of a blind bolt that threads into the bottom half of a shell to be assembled, one applies an alien key or the like to the top of the bolt to stop it from turning. On a rotary base, one also applies an alien key to the top of the bolt to stop it and the entire base from turning.

It is believed to be clear that the above mentioned approach requires the use of backup or holding wrenches and keys which is time consuming and does not comply with today's stringent safety standards in the industry.

German patent no. 1,902,413 and European patent document EP 0 593 742 disclose solutions for stopping the bolt from turning by keeping an inner sleeve/washer assembly stationarily during tightening of an outer nut. While the solution proposed in German patent no. 1,902,413 utilizes a holding wrench to do so, the solution proposed in the European patent document EP 0593742 uses a single tool which applies a holding force to the inner sleeve/washer assembly and an active force to the nut. The solution proposed in the European patent document works well on a static base, however it does not work on the rotary base as the rotary base eliminates the bearing face friction on which this solution relies to keep the inner sleeve/washer assembly stationarily with a holding force equal to the turning force. This means that in order to apply the tool disclosed in the European patent document on a rotary base, an additional holding tool is necessary to keep the inner sleeve/washer assembly stationary during tightening.

The holding tools in both above specified documents have to abut against an adjacent stationary object, simply because the nut assembly is subject to drag friction, which makes the nut or the inner sleeve/washer assembly turn at will. The only difference between the two solutions is that in the solution disclosed in the German patent document the inner sleeve/washer assembly has to be stopped by holding a tool from turning in the direction of nut, while in the solution proposed in the European patent document the inner sleeve/washer assembly has to be stopped from turning in the opposite direction of the nut. As the drag friction is sporadic, neither a human being nor a tool could instantly react when in the German patent document the turning force increases or decreases as a result of the drag friction, or when in the European patent document the friction variation lets the inner sleeve-washer assembly turn instead of the nut. That is why both require holding tools so as to keep the inner/washer stationary.

SUMMARY OF THE INVENTION

Accordingly, it is an object of the present invention to provide a method of tightening and loosening an object on a rotary base, which avoids the disadvantages of the prior art.

More particularly it is an object of the present invention to provide a method of tightening and loosening an object on a rotary base, which allows to avoid the use of a separate holding tool.

In keeping with these objects and with others which will become apparent herein after, one feature of the present invention resides, briefly stated, in a method of tightening and loosening an object to a rotary base torsion-free, comprising the steps of providing a single power tool having a tool housing portion and a driving portion which are coaxial with one another and provide equal but opposite forces; connecting a bolt with the rotary base; connecting a first part which includes a sleeve/washer assembly to one of said portions to be turned by said one portion, which sleeve/washer assembly includes a sleeve with a thread cooperating with a thread of the bolt and a washer abutting against the object; connecting a second part to the other of said portions to be turned by said other portion, which second part includes a nut having a thread cooperating with another thread of the first part; turning the first part by said one portion so that the first part, the bolt and the rotary base turn together while the second part remains free of rotation to urge the bolt to move in a desired axial direction to tighten or loosen the object to the rotary base; and turning the second part by said other portion so that the rotary base, the bolt and the first part remain free of rotation to urge the bolt in the desired axial direction to tighten or loosen the object to the rotary base.

The advantage of the proposed method is that the bolt remains free of torsion, no additional holding tool is required, no adjacent stationary object is required, there will be no side load applied to the bolt as a result of abutting a holding tool against the stationary object, the job becomes safer, the setup is simpler, and the work gets done faster.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view illustrating a method of tightening an object on a rotary base in accordance with the present invention.

DESCRIPTION OF THE PREFERRED EMBODIMENTS

For tightening or loosening an object to a rotary base and the like a single power tool is provided as identified with reference numeral 1. The power tool 1 has a tool housing portion 2 which accommodates an inner turning mechanism, which is known per se in the art and powered by an outside source, to cooperate with a driving portion 3. The power tool 1 is actuated for example by a handle 4.

The power tool is used for tightening and loosening the object 5 which can be formed for example as a gear, to the rotary base 6 which can be formed for example as a rotor. A bolt 7 passes through an opening in the object 5 and is connected, for example screwed, with the rotary base 6.

A first part is formed as a sleeve/washer assembly and includes a sleeve 8 and a washer 9. The sleeve 8 is connected with the driving portion 3 so that they rotate jointly, but the sleeve 8 can axially displace relative to the driving portion 3, for example due to interaction of polygonal cross-sections of the outer surface of the driving portion 3 and of the inner opening with the upper transverse part of the sleeve 8. The sleeve 8 has an outer thread 21, an inner thread 22, and outer splines 23 on its lower part. The washer 9 has inner splines 24 cooperating with the outer splines 23 of the sleeve 8. The inner thread 22 of the sleeve 8 cooperates with an outer thread 25 of the upper part of the bolt 7.

A second part includes a nut 10 and a connecting member 11. The connecting member 11 is connected with the tool housing portion 2 for joint rotation therewith, for example by inner splines 26 cooperating with outer splines 27 of the tool housing portion 2. It also has castellations 28 provided on the lower end and cooperating with castellations 29 on the upper end of the nut 10. The nut 10 further has an inner thread 30 which cooperates with the outer thread 21 of the sleeve 8 of the first part.

When the driving portion 3 is turned by the inner turning mechanism of the power tool 1, the first part including the sleeve 8 and the washer 9 turns, the bolt 7 also turns, and the rotary base 6 also turns, while the second part which includes the nut 10 and the connecting member 11 remains free of rotation, and therefore the bolt 7 moves in a desired axial direction to tighten or loosen the object 5 to the rotary base 6.

When the tool housing portion 2 is turned for example by a reaction force generated by turning of the driving portion 3, the second part which includes the nut 10 and the connecting member 11 is turned while the rotary base 6. the bolt 7, and the first part including the sleeve 8 and the washer 9 remain free of rotation, so that the bolt 7 moves in the same desired axial direction as a result of cooperation of the outer thread of the sleeve 8 with the inner thread of the nut 10 to tighten or loosen the object 6 to the rotary base 6.

When the method is performed in accordance with the present invention, the bolt 7 remains free of torsion, no additional holding tool is required, no adjacent stationary object is required. There will be also no side load applied to the bolt as a result of abutting a holding tool against the stationary object. Also, the job becomes safer, the setup is simpler, and the work is done faster.

In another modification of the invention the first part can be connected to the tool housing portion, while the second part can be connected to the driving portion.

It will be understood that each of the elements described above, or two or more together, may also find a useful application in other types of constructions differing from the types described above.

While the invention has been illustrated and described as embodiment in a method of tightening and loosening an object, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspect of this invention.

What is claimed as claimed as new and desired to be protected by letters Patent is set forth in the appended claims.

What is claimed is:

1. A method of tightening and loosening an object to a rotary base torsion-free, comprising the steps of providing a single power tool having a tool housing portion and a driving portion which are coaxial with one another and provide equal but opposite forces; connecting a bolt with the rotary base; connecting a first part which includes a sleeve/washer assembly to one of said portions to be turned by said one portion, which sleeve/washer assembly includes a sleeve with a thread cooperating with a thread of the bolt and a washer abutting against the object; connecting a second part to the other of said portions to be turned by said other portion, which second part includes a nut having a thread cooperating with another thread of the first part; turning the first part by said one portion so that the first part, the bolt and the rotary base turn together while the second part remains free of rotation to urge the bolt to move in a desired axial direction to tighten or loosen the object to the rotary base; and turning the second part by said other portion so that the rotary base, the bolt and the first part remain free of rotation to urge the bolt in the desired axial direction to tighten or loosen the object to the rotary base.

2. A method as defined in claim 1; and further comprising connecting the washer and the sleeve of the sleeve-washer assembly so that the sleeve is axially displaceable but non-rotatable relative to the washer.

3. A method as defined in claim 1; and further comprising passing the bolt freely through an opening in the object.

\* \* \* \* \*